INVENTOR.
HENRY O. BARTON,
BY
Wolfe, Hubbard, Voit & Osann
ATTORNEYS.

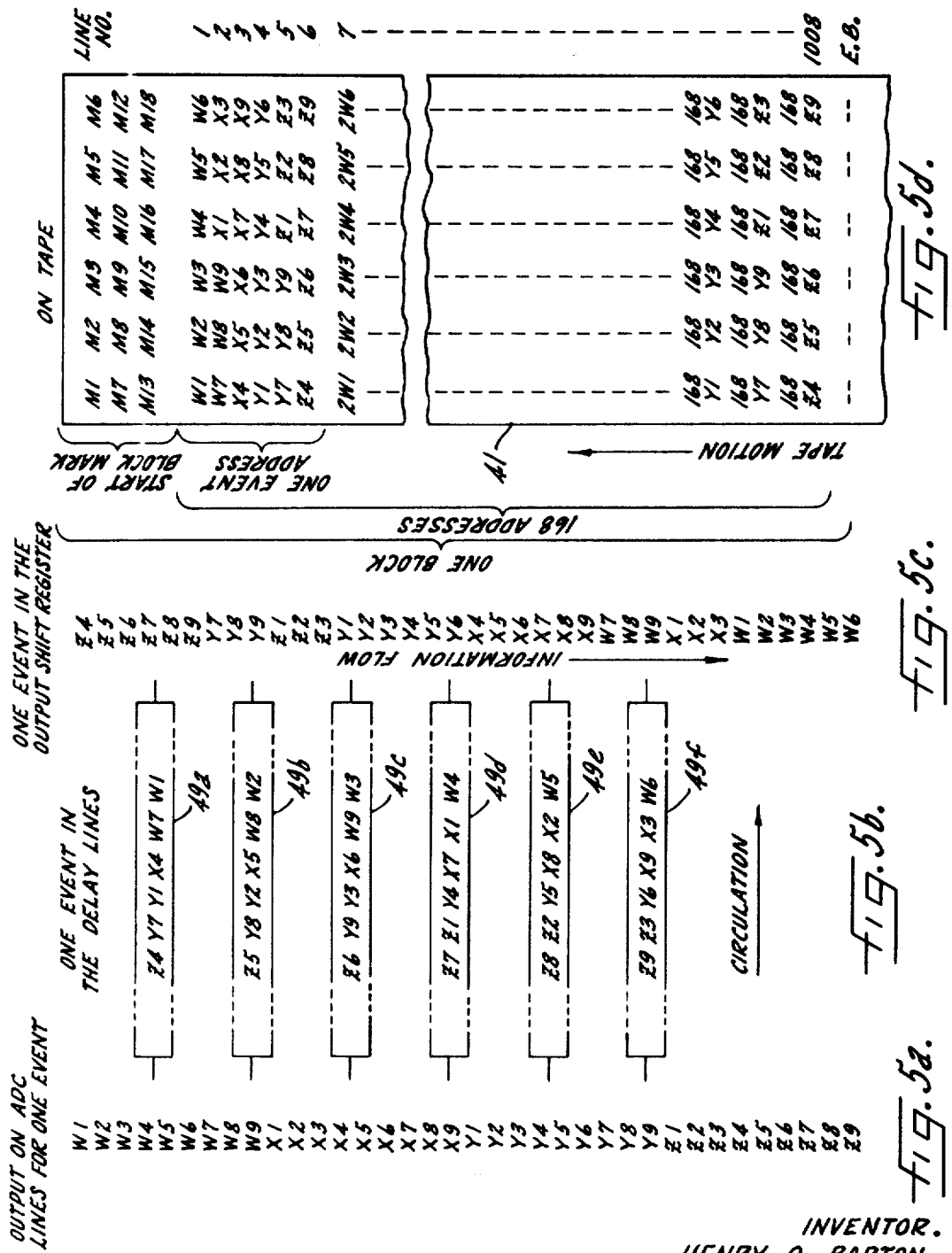

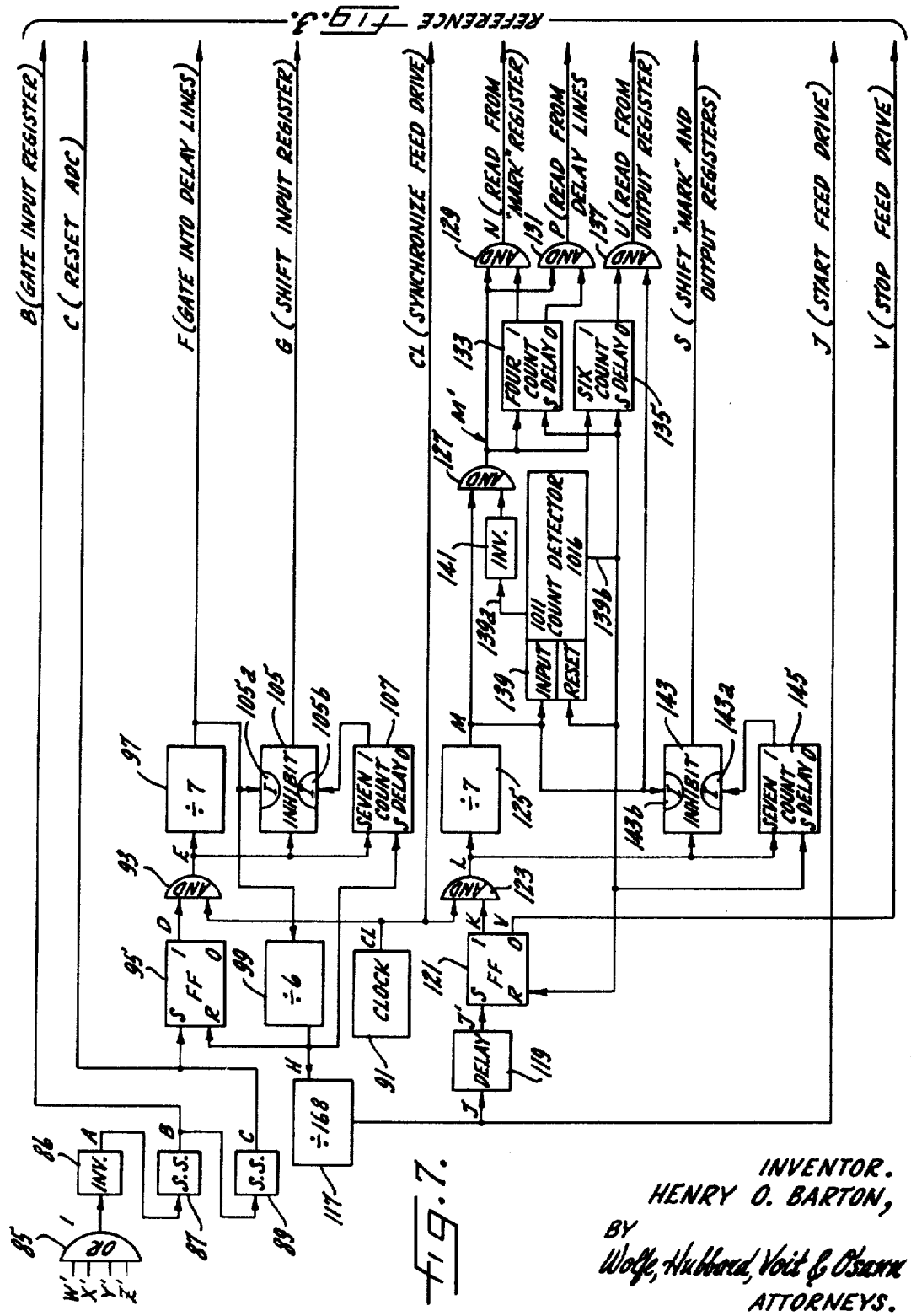

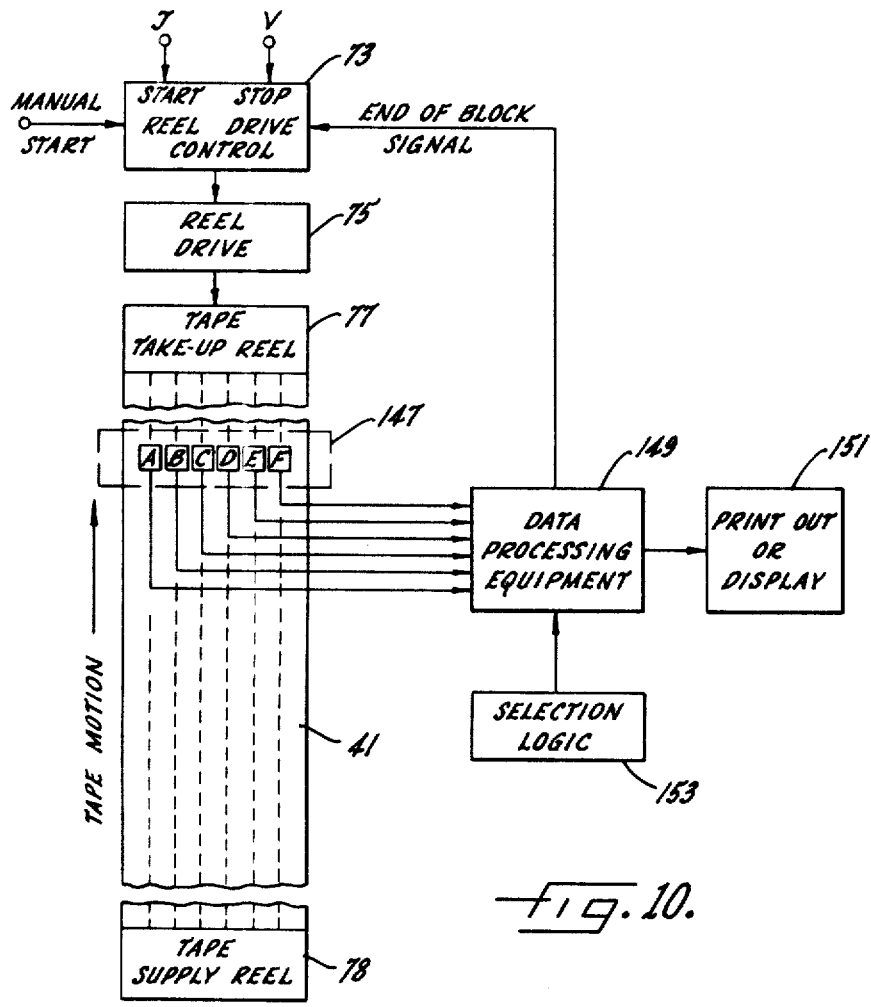

United States Patent Office 3,439,342
Patented Apr. 15, 1969

3,439,342
DATA ORGANIZATION SYSTEM FOR
MULTIPARAMETER ANALYZERS
Henry O. Barton, Skokie, Ill., assignor, by mesne assignments, to Packard Instrument Company, Inc., Downers Grove, Ill., a corporation of Delaware
Filed May 11, 1966, Ser. No. 549,405
Int. Cl. G11b 13/00
U.S. Cl. 340—172.5                 15 Claims

ABSTRACT OF THE DISCLOSURE

By means of a system featuring a set of T recirculating delay line memories, digital data representing a large number of randomly occurring multiparameter events are recorded at regular intervals on successive lines of multi-track magnetic tape. Each of a series of E random events is detected by N parameter detectors and the output of each of the detectors is converted into B digital bits, all of which appear concurrently. The NB bits representing each event are successively fed, a T bit character at a time, into T recirculating delay line memories, each delay line receiving a single bit of each character. This process is repeated until a sufficient number of events have occurred to cause the storage in the delay line memories of a sufficient number of data bits to fill a block length of T track magnetic tape. Once this condition occurs the data is transferred from the delay line memories to the magnetic tape a T bit character at a time so that, as the tape is transported past is associated set of T recording heads, successive characters being read from the delay line memories may be concurrently recorded in successive rows thereon. The delay line memories have sufficient storage capacity so that they may accumulate data associated with subsequent random events while the data associated with past events are being transferred from them to the magnetic tape.

---

This invention relates in general to a multiparameter analyzer system and more particularly to a data organization system for a multiparameter analyzer which permits the recording of randomly occurring events upon magnetic tape without the necessity to start and stop the tape upon the occurrence of each event.

Multiparameter analyzer systems are used to detect several parameters of randomly occurring events so as to permit classification of a large number of events for subsequent analysis. Typically, such analyzers include several detectors which simultaneously signal by the amplitude of their outputs several different qualities or parameters of a single event such as the disintegration of a radioisotope.

Classification of events is performed by assigning a different classification or address to each combination of values of the several parameters which are being detected for the observed events. A storage location is then provided in a memory system such as a magnetic core matrix for each address and the number of times that the parameters fall into the different classifications or addresses is observed and recorded. In this way the experimenter using the multiparameter analyzer may gain a clear statistical picture of the character of a very large number of events.

A typical multiparameter analyzer may be required to detect four parameters of a recurring event and each parameter may fall into 1024 different amplitude classifications. The number of possible combinations of amplitudes for the four parameters would therefore be $1024^4$ or approximately 1.1 billion combinations. Since each combination of parameter values, that is, each address, must have its individual storage location in the memory, such a system would require a memory having 1.1 billion storage locations. If a magnetic core memory were used, this would mean 1.1 billion magnetic cores. The cost of such a system would be prohibitive.

A possible alternative to the use of magnetic cores as a memory element is magnetic tape. The digitized address of each event might be recorded on a relatively short section of tape as a series of lines of information which could then be classified by data processing equipment so as to yield the same ultimate information that would be provided by a magnetic core memory. But randomly distributed and frequently occurring events are difficult to record on tape efficiently. If the tape is run continuously, much of it will be unused. On the other hand, to start and stop the tape each time an event occurs would not only subject the tape drive mechanism to undue wear, it would also require an almost impossibly fast acceleration of the tape in order that the tape be brought up to its operating speed in time to receive the address of the event.

Accordingly, it is an object of this invention to provide a method and apparatus for recording upon magnetic tape in an ordered array the multiparameter addresses of randomly occurring events without the need to stop and start the tape for each event.

It is a further object of the present invention to provide a method and apparatus for accepting a series of randomly occurring pulse groups representing the multiparameter addresses of a series of randomly occurring events, and for rearranging the time relationships of these pulse groups so that they may be recorded on magnetic tape in an ordered array without the need to start and stop the tape for each event.

It is another object of this invention to provide a method and a means whereby the parameters of each event in a series of randomly occurring events are converted into a binary coded pulse group representing the address of the event and stored until enough events have been detected and their parameters stored to fill a predetermined length or "block" of magnetic tape.

It is still a further object of this invention to provide a data organization system for a multiparameter analyzer which can accumulate in binary coded form the addresses of a sufficient number of randomly occurring events to fill a predetermined length of magnetic tape so that they may be recorded as a tightly packed block of information on the tape and which can accept additional addresses while binary coded addresses of a previous series of events are still being recorded on the tape.

Other objects and advantages will become apparent as the following description proceeds, taken in connection with the following drawings in which:

FIGS. 5a through 5d are information flow diagrams showing the location and arrangement of information in various parts of the system of FIG. 3;

FIG. 7 is a block diagram of exemplary apparatus which may be used to provide timing pulses for the system of FIG. 3;

FIG. 10 is a generalized block diagram of the read-out equipment for reproducing and utilizing multiparameter address information previously recorded on magnetic tape.

While the invention has been shown and will be described in some detail with reference to a particular embodiment, there is no intention that it be limited to such detail. On the contrary, it is intended here to cover all modifications, alternatives and equivalents falling within the spirit and scope of the invention as defined in the appended claims.

THE PRIOR ART

Figure 1:
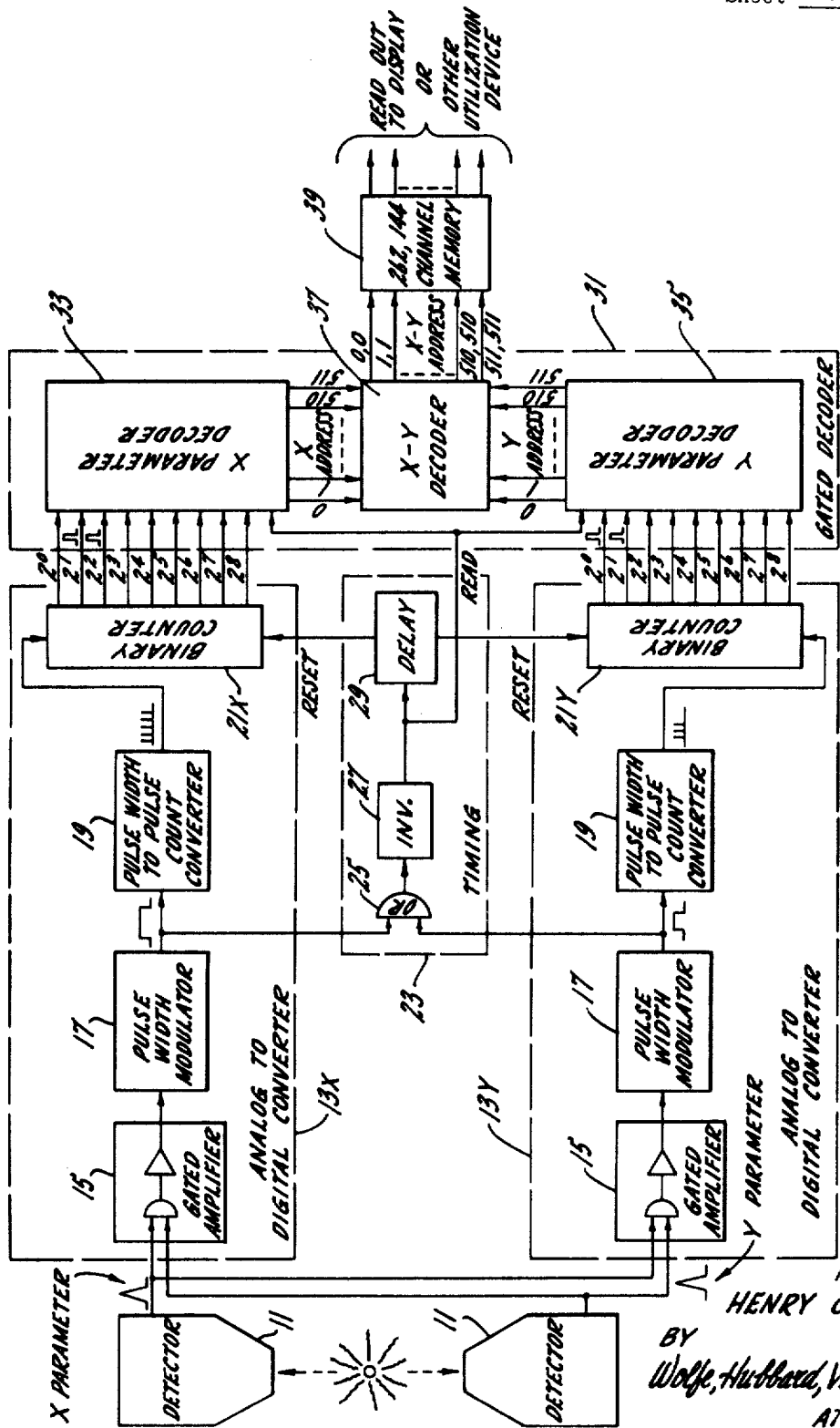
FIGURE 1 is a block diagram of a prior art multiparameter analyzer system.

Before describing a system incorporating features of the invention, it will be useful to review briefly, with reference to FIG. 1, the manner in which a prior art system classifies multiparameter events. The system of FIG. 1 is relatively simple, being directed to classifying events according to only two parameters, with each parameter having 512 different magnitude classifications. The two parameters, labeled X and Y, are each sensed by a detector 11 which produces a voltage whose magnitude is proportional to the detected parameter. These voltages are fed through analog to digital converters (ADC's) 13X and 13Y respectively, wherein each voltage is converted into a unique combination of binary voltage levels at a group of output lines.

More particularly, each ADC typically includes a gated amplifier 15 so that only those events are processed which produce simultaneous responses by the two detectors 11. In each ADC 13 the output of the gated amplifier 15 is fed to a pulse width modulator 17 (PWM) whose output is a pulse proportional in duration to the magnitude of the amplified voltage at its input. The output of each PWM is then fed to a pulse width-to-pulse count converter 19 which produces a burst of pulses proportional in number to the duration of the PWM output and hence to the analog voltage pulse amplitude produced by the parameter detector 11. This pulse train is then fed to a binary counter 21 which produces on its several output lines a unique combination of voltage output levels representative of the number of pulses fed to its input. Thus the output of each ADC consists of a simultaneously occurring group of voltage levels upon particular ones of the output lines, each combination representing a different detected parameter value.

In the example shown in FIG. 1, five pulses were fed to the binary counter 21X of channel X and three pulses were fed to the binary counter 21Y of channel Y. Accordingly, outputs are shown at the $2^2$ and the $2^1$ output lines of the X channel ADC, and voltage levels are shown at the $2^1$ and $2^0$ output lines of the Y channel ADC. In this simple example, the digitally signaled numerical address for the one event is thus $X=5$, $Y=3$.

The timing circuit 23, which includes an OR gate 25, an inverter 27, and a delay circuit 29, detects completion of the analog to digital conversion of the X and Y parameters, marked by the termination of the outputs of the pulse width modulators of both ADC's 13X and 13Y. When this occurs, the output of the OR gate 25 drops, the output of the inverter 27 rises, and an enabling pulse is fed to the gated decoder 31 so as to admit to it the ADC binary output signals. Typically, this decoder will include a first decoder unit 33 for the X parameter and a second decoder unit 35 for the Y parameter. Both the X parameter and the Y parameter decoder units may be diode matrixes, each having eight input lines and 512 output lines with each output line representing energization of a different one of the 512 possible combinations of input lines. The 512 outputs of the X parameter and Y parameter decoders may then be fed to an X–Y decoder 37, a third diode matrix having two sets of 512 input lines connected to column lines and row lines of the X–Y diode matrix respectively. The X–Y decoder matrix would have 262,144 output lines representing that number of possible combinations in the energization of its row and column lines by the output lines of the X parameter and Y parameter decoders. Each output line of the X–Y decoder 37 is then fed to one channel or elemnet of a 262,144 channel memory 39 wherein each channel may be a core of a magnetic core memory matrix. In the present example, therefore, there are a total of 262,144 possible multiparameter addresses.

Consideration of the prior art system shown in FIG. 1 shows that even with only two parameters, the number of memory locations and hence the size of the memory required becomes extremely large. If an event is to be classified according to M possible amplitude value ranges, the event will have $M^n$ possible addresses and will require that many memory locations. Obviously, if the number of parameters $n$ were doubled from two to four, the number of memory elements $M^n$ that would be required would not merely double, but would be the square of the number required for two parameters. If the number of possible values ranges M for each parameter were also increased, the required number of memory channels would be even greater. Obviously, there is a limitation imposed by size and cost to the number of parameters that can be handled by a system of the type shown in FIG. 1 and this limitation would probably be exceeded in most situations if any more than two parameters were to be monitored with the number of possible parameter values illustrated in FIG. 1.

BRIEF DESCRIPTION OF THE INVENTION

Figure 2:
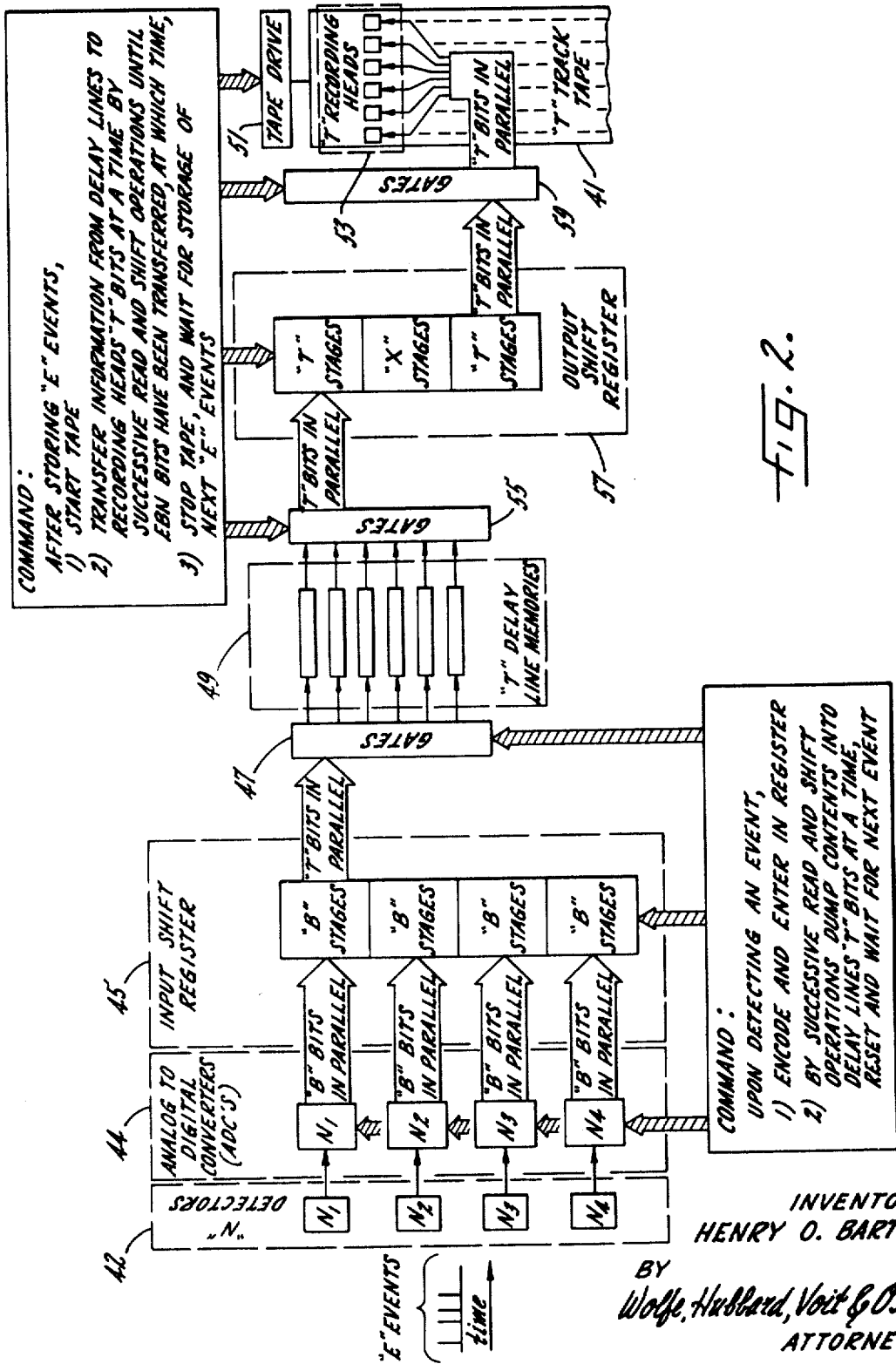
FIG. 2 is a generalized block diagram of a data organization system for a multiparameter analyzer system embodying features of the present invention.

FIG. 2 illustrates in accordance with the principles of the present invention the concept of an entirely different manner of storing the addresses of a large number of multiparameter events, permitting classification of events on the basis of four and even more parameters. With the system of FIG. 2, the N parameter addresses of E randomly occurring events are recorded on a predetermined length, or block, of recording tape. With one standard recording technique, such a block of information comprises L (typically 1008) lines of information, and each line (or character) is made up of a bit of information in each of T (typically six) tracks of tape spanning the width of the tape. Accordingly, the principal function of the system of FIG. 2 is to accumulate the N parameter addresses of a series of events until a sufficient number E of events have been accumulated to fill a block of T track tape at which time all of the accumulated addresses are recorded as a block on the T track tape in the form of an ordered array of L T-bit lines. The events are detected by N (typically 4) parameter detectors 42, the output of each detector being converted into B (typically 9) bits appearing concurrently, in parallel, at the output lines of an associated analog to digital converter (ADC) 44 so that, in all, each event is represented by NB bits appearing in parallel during a single time period at the outputs of the ADC units.

The NB bits appearing on the output lines of the ADC units 44 are fed to NB input channels of a multi-channel serializer 45 having NB input channels and T output channels so connected that the NB bits which were presented by the converters 44 to the serializer 45 during a single time period are in turn delivered by it at its output channels in NB/T steps as NB/T groups of T concurrent bits. While the serializing function can be performed by means of multiple gating, wherein successive subgroups of a group of gates whose outputs are coupled to T output lines, are sequentially enabled to transfer NB bits T bits at a time to the T output lines, the present description will be based on the use of a shift register to perform the serializing function. Thus, the B bits which appear on the B output lines of each ADC 44 are entered into B stages of an input shift register 45 so that in all, NB bits appearing in parallel on NB encoder output lines are entered in parallel into NB stages of the shift register 45. The contents of the top T stages of the input shift register are then transferred in parallel through a set of gates 47 to a set of T single input, single output memory units 49 each of which may be either a recirculating delay line memory unit or a track of a magnetic drum memory including a recording head for an input and a read head for an output. For sake of a specific example, this brief description and FIG. 2 refer to a recirculating delay line type of memory unit.

Following the transfer of the contents of the top T input register stages to the T memory units 49, the input register 45 is shifted T times and the next T bits are transferred from the T top stages of the input shift register into the T delay lines 49. This process is repeated NB/T times until the NB bits have been read out from the input shift register. At this time the input shift register is reset in readiness to receive NB bits which will be produced by the ADC's 44 in response to the next event.

The above process of detecting, encoding, and transferring to the delay line memory units is repeated until a sufficient number (E) of events have occurred to fill a block of data on the tape. When information is recorded on multitrack tape in digital form, each line of recording on the tape is a "character" made up of a "bit" of information in each track. Since there are T tracks on the tape 41, if there are to be L lines of T bits in each data block on the tape, the total number of bits that are to be accumulated in the delay line memories is LT. With the address of each event being represented by NB bits, the total number of events which will be permitted to occur before information is read from the delay line memories may be expressed as $LT/NB$.

Substituting the typical numbers mentioned earlier, if $T=6$, $L=1008$, $N=4$ and $B=9$, E, the number of events whose addresses may be accumulated in the delay line memories is 168. A system employing these typical numbers for sake of illustration will be described in detail hereinafter.

After E events have been encoded and the outputs of the ADC units 44 have been transferred through the input shift register 45 to the delay line memories 49, a control signal is fed to the tape drive 51, commanding it to begin to transport the magnetic tape 41 past the T recording heads 53. Information is read out of the delay line memories 49 through a second set of gates 55 T bits at a time into the top T stages of a second, output shift register 57. After each information transfer, the contents of the output shift register 57 are shifted down T stages and the next T bits are then read in parallel from the T delay line memories 49 into the top T stages of the output shift register 57.

Upon arrival of the first T bits at the bottom T stages of the output shift register, they are read out in parallel T bits at a time from these stages through a third set of gates 59 to the T recording heads 53 so that they are recorded as a line of information on the tape 41.

The process of bit transfer from the delay line memories 49 to output shift register 57, subsequent shifting down in the output shift register, and reading out from the output shift register to the recording heads 53 is then repeated at a rate which is synchronized with tape speed to assure the proper number of lines per inch of tape, and continues until L lines of T bits or L T-bit characters have been written on a predetermined length or "block" of the tape. At this time the tape 41 is automatically stopped until the multiparameter address bits of the next E events have been stored in the delay line memories 49 at which time the process of bit transfer from the delay line memories to a block of tape is repeated.

DETAILED DESCRIPTION OF A SYSTEM INCORPORATING THE INVENTION

Referring now to FIGS. 3, 4, 5, and 6, a data organization system incorporating features of the present invention will be described in detail. To aid in correlating the components shown in the block diagram of FIG. 2 with the components shown in the detailed block diagram of FIG. 3, corresponding components will bear identical reference numerals in the two figures, with suffixes being added in FIG. 3 where appropriate to distinguish between individual ones of several identical components. In the text, for sake of simplicity, such suffixes will be referred to only to identify a particular one, or group of a plurality of identical components.

Four parameters W, X, Y, and Z of a multiparameter event are detected by detectors 42w–z and are fed through gated amplifiers 43w–z to the W, X, Y, and Z analog to digital converters 44w–z, respectively. The outputs of the gated amplifiers bear a specific relationship to their inputs which, for example, may be exponential or logarithmic. In the illustrated system the gated amplifiers will be shown as linear amplifiers, with the output of each amplifier being directly proportional to the detector voltage representing the particular parameter fed to its input. The amplifier for each parameter is gated by the output of the detectors for the other three parameters so that the four gated amplifiers will only present voltages to the analog to digital converters if all four parameters W, X, Y, and Z fulfill some chosen condition, which in the present embodiment is that all of them shall occur at the same time. Should any one or more of the parameters of an event fail to fulfill the chosen condition, that event will not be registered by the system.

Figure 3:
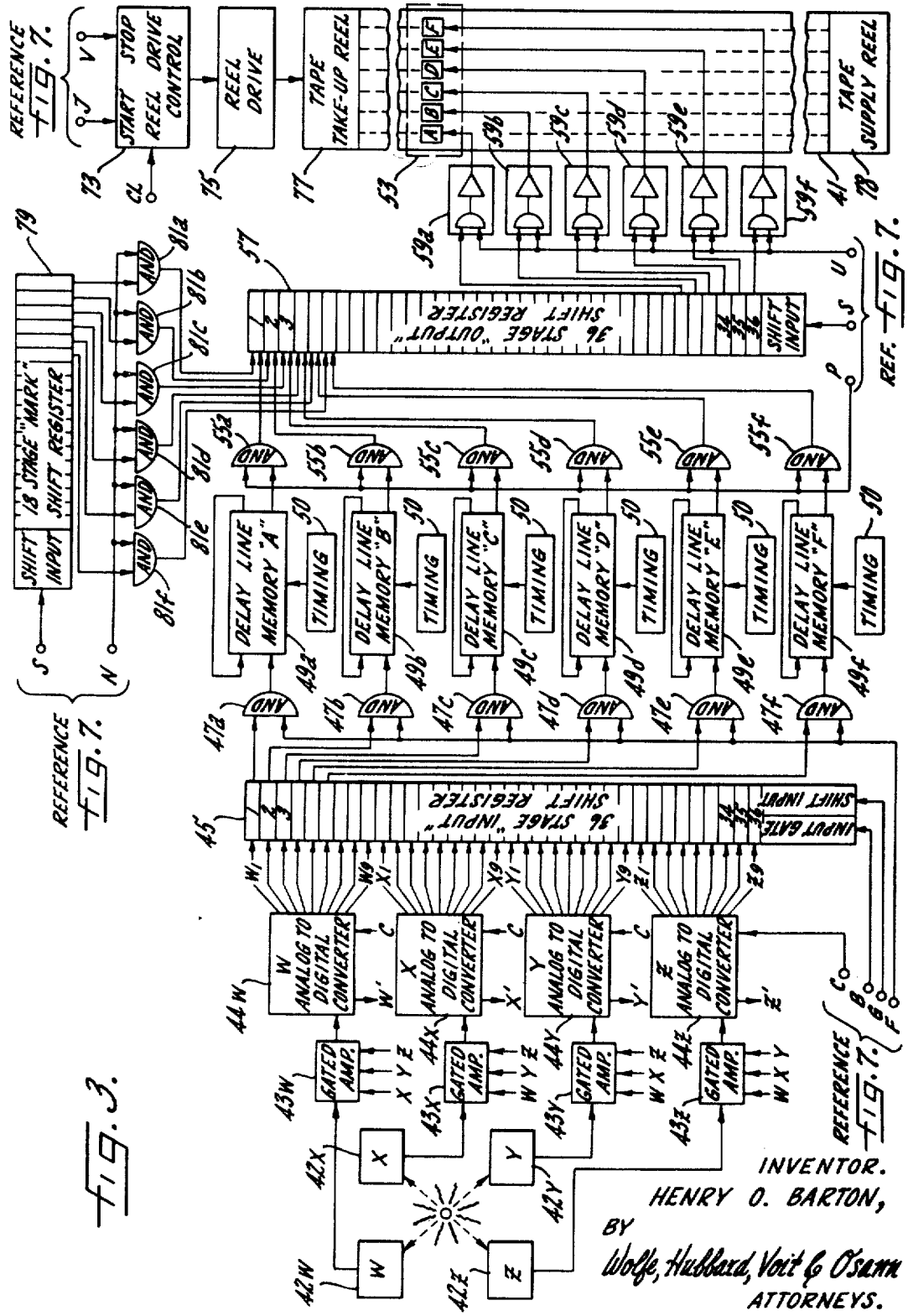
FIG. 3 is a more detailed block diagram of the data organization system shown in FIG. 2.

In the embodiment of the system illustrated in FIG. 3, each ADC has nine output lines, making it possible for each ADC to classify into 512 different digital, numerically defined categories the amplitude of a voltage pulse fed to its input, such representing the magnitude of the sensed parameter. Thus, taking the W parameter as an example, the W analog to digital converter has nine output lines representing the binary numbers $2^0$–$2^8$, and which by combinations of binary "0" and "1" signals thereon may represent any number from 0 to 511.

Figure 4:
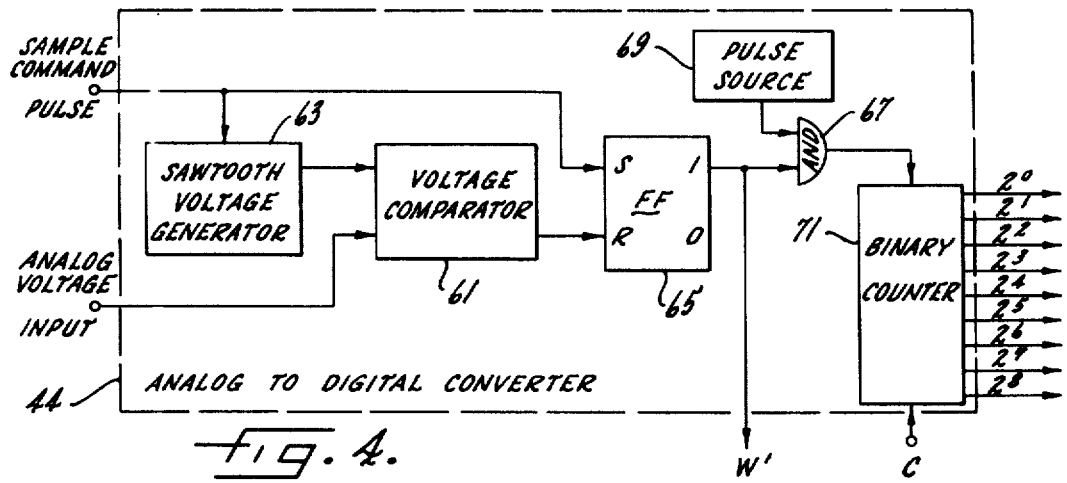
FIG. 4 is a block diagram of a typical analog to digital converter which may be used in a system of FIG. 3.

FIG. 4 illustrates a typical ADC 44 which may be used in the system. Such devices are well known per se in the data processing art and will be described only briefly. The analog voltage which is to be converted is fed to one input of a voltage comparator 61 whose other input receives the output of a sawtooth voltage generator 63. The output of the voltage comparator in turn controls the "reset" input of the bistable flip flop 65. The flip flop units which will be referred to in this application are well known in the electronics art. They are characterized by a "1" output and a "0" output, a set S and a reset R input. A pulse at the S input causes a binary "1" (high voltage level) to appear at the "1" output and a binary "0" (low voltage level) to appear at the "0" output. A pulse at the R input reverses the state of the outputs.

To convert the analog voltage pulse into a binary coded pulse group a command pulse triggers the sawtooth voltage generator causing it to generate a linear rising voltage. The command pulse also sets the flip flop 65 causing its "1" output to rise. When the output of the sawtooth voltage generator reaches the value of the analog voltage fed to the other input of the voltage comparator, the comparator generates a pulse in response to equality of the two signals at its input, and resets the flip flop 65, causing its "1" output to drop. Thus the "1" output of the flip flop 65 was mantained at a high level for a time proportional to the magnitude of the analog voltage being converted.

The time or width modulated voltage level from the "1" output of the flip flop 65 controls an AND gate 67 through which pulses are fed from a constant frequency pulse source 69 to the input of a binary counter 71, so long as there is a binary "1" level voltage supplied from that flip flop. The number of pulses which reach the binary counter 71 will therefore be proportional to the time during which the "1" output of the flip flop 65 remained high, which in turn is proportional to the magnitude of the analog voltage input to the ADC 44.

The binary counter 71, which may be of the type described on page 15, of "High Speed Computing Devices" by Engineering and Research Associates, published in 1950 by McGraw-Hill Book Co., Inc., New York and London, will represent the count of the pulses fed to it from the pulse source 69 by a unique combination of binary "1" and binary "0" (high and low) voltage levels on its output lines. Thus, for example, if the analog voltage fed to the input of the ADC 44 has a magnitude of 261 on a scale where the largest possible value is 511, 261 pulses will be fed to the input of the binary counter 71 and this in turn will be represented by high voltage levels on the $2^8$, $2^2$, and $2^0$ output lines and by low voltage levels on the remaining output lines. This is the conventional binary digital notation, where the decimal number 261 is represented as 100000101.

Returning now to a consideration of the system of FIG. 3, the unique combination of thirty-six voltage levels representing W, X, Y, and Z parameters of the first event are next entered simultaneously and in parallel into a thirty-six stage input shift register 45. In accordance with customary computer terminology, a high voltage level on an output line is considered a binary "1" while a low voltage level on a line is considered a binary "0." Whichever voltage level appears on a line, whether it be high or low, its information content is one bit so that the magnitude of each parameter is represented by nine bits. Entry into the input register 45 is timed to follow completion of the analog to digital conversion process, by application of a gating pulse B to its input gates.

The thirty-six bits, representing the W, X, Y, and Z parameters of the first event, are distributed in the thirty-six stages of the input shift register 45 in the manner shown in FIG. 5a. In particular, the nine bits representing a particular parameter are stored in nine adjacent stages of the register and the four groups of nine bits are stored in four groups of nine adjacent register stages. In the particular example shown, bits representing the W parameter are stored in the top nine stages while the bits representing the X, Y, and Z parameters are respectively stored in successive groups of nine stages in that order.

After the group of thirty-six bits has been transferred to the input shift register, a pulse C is applied to the ADC's, resetting them in readiness to receive the next set of amplified, parameter-representing voltages.

The next step in the data organization process carried out by the illustrated system is to transfer the thirty-six bits from the input shift register 45 to the six delay line memory units 49a–f by successive reading and shifting operations. The information flows through six transfer channels from the top six stages of the input shift register 45 to the inputs of the six delay line memory units. Each transfer channel includes a gate 47 which permits the information stored in the top six stages to be transferred to the inputs of the delay line memory units 49 at a selected time. The gates 47 are enabled by a set of clock pulses F (FIG. 6a), the first of these occurring shortly after the bits representing the parameters of the first event have been fed in parallel into the input shift register 45.

Upon receiving the first control pulse F, the gates 47 cause the contents of the top six register stages to be fed simultaneously to the inputs of the six delay line memory units 49 with the top delay line memory unit 49a receiving the contents of the top stage of the input shift register and similarly the second, third, fourth, fifth, and sixth delay line memory units 49b–f receiving the contents of the second, third, fourth, fifth, and sixth stage of the input shift register. Consequently, the six bits W1–W6 which had been stored in the top six stages of the input shift register 45 are distributed among the six delay line memories as shown in FIG. 5b. It will be seen that while thirty-six bits are dumped in parallel into the register 45, six bits at a time are read out of that register into the six delay lines 49.

After the bits stored in the top six stages of the register have been transferred to the delay lines 49, six shift signals G (FIG. 6a) are applied to the shift input of the input shift register 45, causing all remaining bits to be shifted up through six stages so that the bits contained in register stages 6–12 are shifted up into register stages 1–6. After this shifting operation, a second F pulse is applied to the gates 47, transferring the second set of six bits from the top six stages of the input shift register 45 into the six delay line memory units 49. These six bits are W7–X3 and are distributed among the delay line memory units in the manner shown in FIG. 5b.

The remaining twenty-four bits stored in the input shift register 45 are transferred to the delay line memory units 49 into four groups X4–X9, Y1–Y6, Y7–Z3, and Z4–Z9 by successive operations of shifting up six steps in the register 45 and reading the top six stages into the delay lines.

Transfer of data from the input shift register 45 to the delay line memory units 49 is timed to be sufficiently quick to permit the input shift register 45 to be completely cleared before the next event has been encoded on the outputs of the ADC's 44. Therefore when the next event occurs, its parameters will be encoded and fed to the cleared input shift register as thirty-six bits in the manner described in connection with the encoding of the first event. After these thirty-six bits have been entered in the input shift register, they are transferred in six groups of six bits into the delay line memory units 49 to circulate behind the first group of thirty-six bits. Recirculation of bits in the delay lines 49 is controlled by timing circuits 50 and is typically at a rate which is of the order of two bits per microsecond.

As event after event occurs, its parameters are converted into thirty-six bits, and stored in the delay line memory units 49 until the number of bits circulating in the delay line memory units 49 is sufficient to fill a block on the magnetic tape 41 upon which the multiparameter addresses are to be eventually stored. In a typical packing scheme each block of data on the tape contains 1008 lines of bits, each line, also called a character, comprising six bits of information, and each block of information is preceded by three MARK characters of six bits each to identify the beginning of a block.

Observation of FIG. 5b shows that the multiparameter address of each event is represented by six groups of six-bit characters, so that 168 events will elapse before a tape block of information has been read into the delay line memory units 49. Upon occurrence, encoding, and storage in the delay line memory units of the 168th event, a start signal J (FIG. 6b) is fed to a reel drive control 73, causing a reel drive 75 to be energized so as to unreel tape 41 from a supply reel 78 and move the tape past its associated set of recording heads 53a–f to a tape take up reel 77. A short time later, when the tape has come up to speed, feeding of information into the recording heads 53 begins.

To conform with current data recording practice, the first three lines or characters of information are not taken from the delay line memory units, but are instead derived from a special MARK shift register 79. In particular, the thirty-six stage output shift register 57 receives information from both the delay line memory units 43 and the MARK shift register 79. It will be understood that the use of such a MARK character generator in the data organization system of FIG. 3 is optional and that the generator may be omitted where MARK characters are not required or where such characters are otherwise recorded on the tape, such as by an auxiliary recording device associated with the tape recording equipment.

To indicate the beginning of a block of information on the tape, the MARK shift register is first loaded with eighteen bits representing three MARK characters. The last six stages of the MARK shift register 79 are connected through a set of six AND gates 81a–f to the top six stages of the output shift register 57. After the tape 41 has been brought up to speed, the contents of the last six stages of the MARK shift register 79 are gated through the AND gates 81 by application of a gating or READ pulse N (FIG. 6b) to the respective inputs of those AND gates. After the contents of the last six stages of the MARK shift register 79 have thus been transferred to the top six stages of the output shift register 57, both registers are shifted six times by six SHIFT pulses S (FIG. 6b) applied to their SHIFT inputs, clearing the top six stages of the output shift register and loading the last six stages of the MARK shift register with the second six bit MARK character.

The second and third MARK characters are read into the output shift register 57 by successively applying a READ pulse N to the MARK shift register output gate 81 so as to transfer the contents of the last six MARK shift register stages to the top six output shift register stages, shifting both registers six times so as to clear the contents of the top six output register stages and the last six MARK shift register stages, and then applying a READ pulse N again to read from the MARK register 79 to the output register 57. In all, the three MARK characters are transferred to the output shift register by a series of three READ pulses N interspersed with two sets of six shift pulses S (FIG. 6b). This completes the injection of MARK characters into the output shift register 57 and marks the beginning of data transfer from the delay line memory units 49.

After the last of the MARK characters have been read into the output shift register, its contents are again shifted down six times so as to clear the top six stages. Following this shift operation, a READ pulse P (FIG. 6b) is applied to the delay line memory output gates 55a–f to read the first bit stored in each of the delay line memory units 49a–f into the top six stages of the output shift register 57. After the READ pulse P the contents of the output shift register 57 are shifted down six times. One more character is then transferred from the delay line memory units 49 to the output shift register 57 in the same manner, the READ pulse being again followed by six SHIFT pulses S.

When the transfer of the three MARK characters and of the first two characters in the delay line memory units is complete, READ pulses U (FIG. 6b) are applied to the gating inputs of a set of gated recording head drivers 59a–f. Each gated recording head driver 59a–f receives as its input the output of one of the last six stages of the output shift register 57 and in turn drives one of the six recording heads 53a–f associated with the recording tape 41.

To recapitulate the sequence of the various command or timing pulses and with particular reference to FIG. 6b, the READ pulses U commence after three READ pulses N have been applied to the MARK shift register output gates 81 and two READ pulses P have been applied to the delay line memory unit output gates 55. The first READ pulse U is applied to the output shift register output gates 59 in unison with the third P pulse being applied to the delay line memory unit output gates 55 causing the first MARK character to be recorded on one line of the tape. During the next two SHIFT and READ sequences the remaining two MARK characters are read onto the tape making up the first three lines of the information block.

The state of the output shift register 57 at this time is shown on FIG. 5c which reveals that the register now contains the data bits representing the multiparameter address of the first event shown in FIGS. 5a and 5b. It will be observed that the sequence in which information is arranged is basically the same as that in the delay line memory units 49, the first group of six characters W1–W6 being stored in the bottom six stages of the shift register and successive groups of six bits being stored in succeeding groups of six register stages. At this instant only the first three lines of characters shown in FIG. 6d, comprising MARK bits M1–M18, exist on the tape.

The process of successive transfers of bits six bits at a time from the delay line memory units 49 into the top six stages of the output shift register 57 and corresponding read out of information six bits at a time from the bottom six stages of the output shift register 57 into the recording heads 53 continues in this manner until 1008 six bit groups have been transferred, first from the delay line memory units to the output shift register and then, after being stepped to the bottom of the output shift register, from the bottom six stages of the output shift register onto the tape as 1008 six bit characters.

At this point it is well to observe that, while typically bits recirculate in the delay lines 49 past the gates 55 at a rate of two bits every microsecond, the rate at which bits can be transferred from a delay line to the output shift register 57 is much slower. This is so because the recording rate of available tape recording apparatus is only of the order of 50 to 100 microseconds between characters. Assuming a recording rate of one character every sixty microseconds, it will be seen that with such a recorder the upper limit to the rate at which bits may be transferred from a given delay line 49 to the output shift register 57 will be one bit every sixty microseconds. Consequently, bits will be recirculated in a delay line by means of the timing circuits 50 one or more times between each reading of bits from that delay line in a manner which is characteristic of the operation of recirculating delay line memories.

The distribution of characters on the tape 41 is illustrated in FIG. 5d which shows that following the first three lines in the information block which comprise the MARK characters, there follow in six lines the thirty-six multiparameter address bits W1 through Z9. It will be observed that each line or character on the tape corresponds to a group of bits which are in time registry in the delay line 49. Correspondingly, it will be observed that, at least as to the bits representing one multiparameter event address, the bits which circulate in a given delay line correspond in content and order to the bits which are recorded in a given track of the tape 41.

The multiparameter address of the second event is recorded on the tape as the next six lines of characters of which only the first line, containing bits 2W1–2W6, is shown. When the last character of the last event, including bits 168Z4 through 168Z9 have been recorded on the tape an end block signal V is generated by the equipment, signalling the reel drive control 73 to stop the reel drive 75.

The reel drive control 73 may contain a delay element (not shown) to permit a predetermined length of tape to be drawn past the recording heads after generation of the V pulse. This method of recording would be employed where the tape is to have a series of information blocks of a first given length (usually 1.75 inches) separated by a series of spaces of a second predetermined length (usually .75 inch).

The last line of information in a block is usually an end of block (E.B.) line of bits, and such an E.B. line is shown in FIG. 5d as the last line in the data block on the tape. The means for generating such an end of block line are well known and are not shown in FIG. 3. It will suffice to say that generally the end of block line is automatically recorded on the tape in response to the recording on the tape of a predetermined number of characters which in the present example is 1008.

Proper distribution of characters on the tape is insured by synchronizing the rate of data transfer from the delay line memory units 49 through the output shift register 57 to the recording heads 53 with the rate at which the tape 41 is driven past the recording heads. Thus if 1008 six bit characters are to be recorded along 1.75 inches of tape moving at, say 24 inches per second, the rate of data transfer should be such that a six bit character is transferred to the recording heads every $$\frac{1.75}{1008 \times 24}$$

seconds, or once every 72 microseconds.

To achieve proper synchronization between the data storage and shifting elements and the tape drive, the same clock pulse source which times the READ and SHIFT operations into and from the output shift register 57 is also used to time the reel drive control 73. This is indicated in FIG. 3 as a CL input to the reel drive control 73 and will be further described in connection with the timing circuit diagram, FIG. 6a.

According to a feature of the present invention, the delay line memory units 49 have a capacity which is greater than that required to store a block of characters so that the multiparameter addresses of events may be stored in the delay line memory units even while the bits representing the multiparameter addresses of the last group of 168 events are being transferred to the tape. Thus it is possible that after a block of information, in the instant example 1008 lines representing 168 events, has been transferred from the delay line memory units and recorded on tape, sufficient information has again accumulated in the delay line memory units 49 to fill another block of tape. In this event, the previously described sequence can be repeated right after the last block of information has been recorded on the tape. In such a case another J pulse is applied to the start input of the reel drive control unit 73 to start the tape 41. Then three MARK characters are transferred from the MARK shift register followed by another 1008 groups of six characters recorded on the tape as 1008 characters.

*Timing*

Figure 6A:
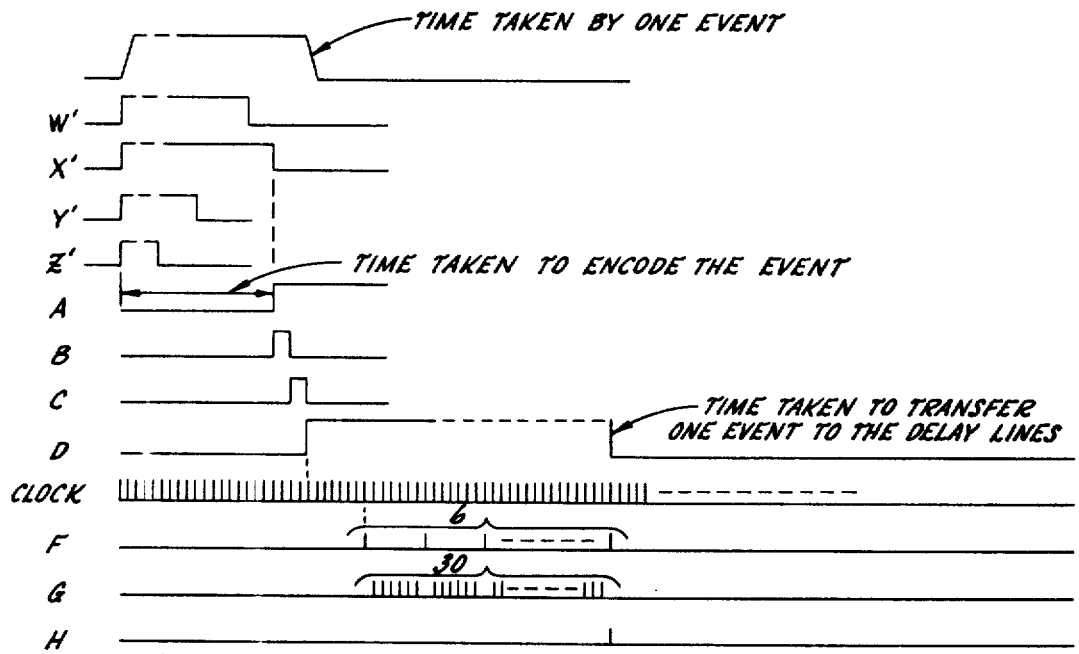
FIGS. 6a and 6b are timing diagrams showing the time relationships of control signals at various points in the system utilizing the present invention.
Figure 6B:
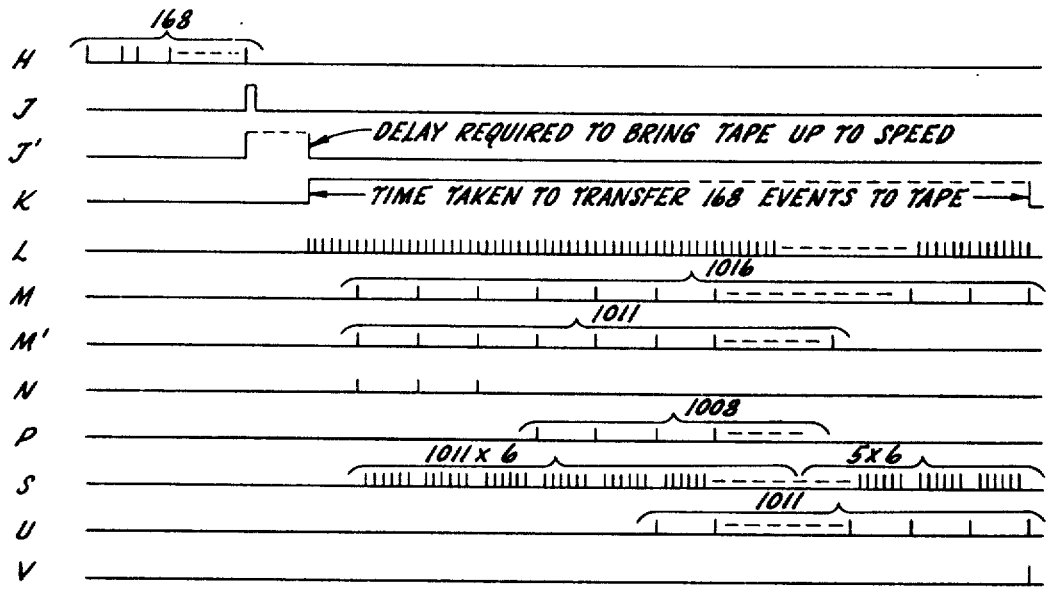

FIGS. 6a and 6b have been referred to to illustrate the sequence in which certain events occur in the data organization system of FIG. 3. A simple timing signal generating system shown in FIG. 7 will now be discussed which may be used to produce the several timing signals necessary to cause the various parts of the system to cooperate in proper sequence.

From a discussion of the operation of FIG. 3 it will be recalled that a gating pulse B is to be fed to the input shift register 45 after the W, X, Y, and Z parameters have been encoded into voltage levels at the outputs of the analog to digital converters 44. The ADC 44 shown in FIG. 4 provides a convenient voltage for indicating the period during which conversion is taking place. This point is the "1" output of the flip flop 44 which, it will be recalled, is raised to a binary "1" level at the instant that conversion begins and is dropped to a binary "0" level at the instant that conversion ends. This output voltage is indicated in FIG. 4 as W' and corresponding voltages for the other ADC units are indicated in FIGS. 3 and 7 as X', Y', and Z'.

The W', X', Y', and Z' outputs of the W, X, Y, and Z ADC units are fed to OR gate 85 (FIG. 7) which therefore produces a binary "1" (high) voltage level at its output until all ADC units have completed the conversion of their respective parameter voltages. The output of the OR gate is inverted in inverter 86 whose output A will therefore rise to a binary "1" level at the instant when the last analog to digital conversion has been completed, which in the example illustrated in FIG. 6a is the conversion of the X parameter.

The leading edge of voltage A triggers a first single shot oscillator 87 which produces the voltage pulse B used to enable the input gate of input shift register 45. The output pulse B of single shot 87 is of a predetermined duration and triggers with its trailing edge a second single shot oscillator 89 which in turn generates the pulse C used to reset the W, X, Y, and Z ADC units. The duration of pulse B is selected to cause the pulse C to start a sufficient time after the pulse B so that information may be read from the ADC units 44 into the input shift register 45 before the ADC units are reset.

The next set of control pulses required to operate the data organization system includes the READ pulses F of which there must be six. As will be recalled, first there must be an F pulse to read out the top six stages of the input shift register 45, after which there must be six SHIFT pulses G to dump six more bits into the top six stages of the input shift register 45 following which there must be another READ pulse F and so on, there being in all six READ pulses F interspersed with five groups of six SHIFT pulses G (FIG. 6a).

To generate the required F and G pulses, a clock 91 is provided whose output is gated through an AND gate 93 under the control of a flip flop 95. The output of AND gate 93 is fed through a divide-by-seven circuit 97 in order to generate a pulse F on every seventh clock pulse gated through AND gate 93 and the output of the divide-by-seven circuit is fed back through a divide-by-six circuit 99 to the reset input of the flip flop 95 so as to discontinue the gating of clock pulses through AND gate 93 after six F pulses have appeared at the output of the divide-by-seven circuit 97.

More specifically, flip flop 95 is set on the trailing edge of pulse C at which time clock pulses from the clock 91 are enabled to flow through gate 93 appearing as pulses E at the input of divide-by-seven circuit 97. Upon arrival of the seventh E pulse at the input of divide-by-seven circuit 97, that circuit produces an output pulse F and on the arrival of every seventh E pulse thereafter, the divide-by-seven circuit will produce a pulse F at its output. Six F pulses are generated in this manner. The sixth F pulse triggers the divide-by-six circuit 99 causing it to produce pulse H which resets the flip flop 95 and discontinues pulses D, E, and F.

Figure 8:
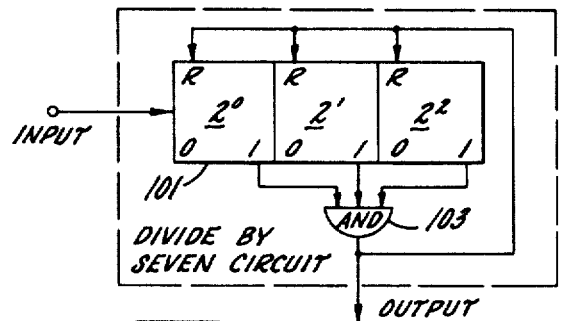
FIG. 8 is a block diagram of a typical divide-by-seven circuit may be used in the circuit of FIG. 7.

FIG. 8 shows a typical configuration which may be used for the divide-by-seven circuit of FIG. 7. It consists of a three stage binary counter 101 with the "1" output of each stage being connected to an input of an AND gate 103 whose output is connected to the reset inputs of all three stages. The output of the AND gate 103 is also the output of the divide-by-seven circuit.

In the well-known manner of operation of binary counters, the "1" outputs of all three stages will rise to a binary "1" level only when seven input pulses have arrived at the input terminal of the first binary counter stage. When this occurs all inputs of the AND gate 103 are enabled which therefore produces a binary "1" at its output and also resets the entire divide-by-seven circuit. In this manner the divide-by-seven circuit produces an output and resets itself on every seventh pulse received by it. The divide-by-six circuit would be similar, except that the AND gate 103 would receive the "1" outputs of the second and third stages and the "0" output of the first stage of the binary counter 101.

The gated clock pulse train E is also used to generate the SHIFT pulse train G. As will be recalled from the explanation of the divide-by-seven circuit 97 in connection with FIG. 7, six E pulses occur between every F pulse and in addition a seventh E pulse occurs in coincidence with each F pulse. Thus pulse train G, which is to consist of six pulses between each pulse in the F pulse train, is simply derived by feeding the E pulse train through an inhibit gate 105 whose first inhibit input 105*a* is controlled by the pulses in the F pulse train.

If this expedient alone were used, pulse train G would include every pulse in pulse train E with the exception of those pulses which coincide with pulse train F. This would be six pulses too many, since six E pulses occur before the first F pulse and this would cause input shift register 45 to be shifted six times before it was read, whereas what is required is that the input shift register be read out first and then shifted up six times. Accordingly, the first six pulses are eliminated from the G pulse train by use of a seven-count-delay circuit 107 whose "1" output controls a second inhibit terminal 105*b* of the inhibit gate.

Figure 9:
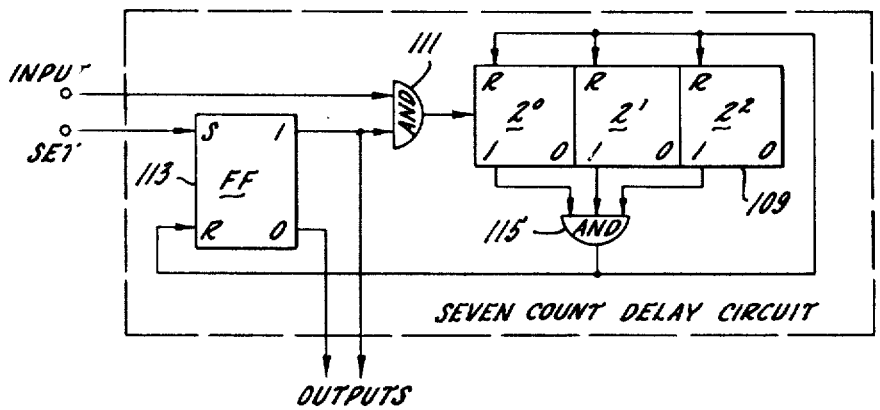
FIG. 9 is a block diagram of a typical seven pulse delay circuit which may be used in the circuit of FIG. 7.

FIG. 9 shows a typical circuit which may be used as a seven-count-delay. It will be seen that it is essentially the same as the circuit of FIG. 8 except that the binary counter 109 receives its input through an input AND gate 111 having an input terminal controlled by the "1" output of a flip flop 113. Also, the output AND gate 115 resets not only the binary counter 109 but also the flip flop 113. The circuit is prepared for operation by setting the flip flop 113 which, through its "1" output enables the flow of pulses through the input AND gate 111 to the binary counter 109. On receiving the seventh input pulse, the binary counter 109 enables all three inputs of the output AND gate 115 causing the binary counter and the flip flop to be reset. Thereafter this circuit will be inoperative and will produce no further pulses until the flip flop 113 is again set.

Returning to FIG. 7, the seven-count-delay circuit 107 is initially set so that its output is at a level which inhibits the inhibit gate 105 and prevents E pulses from passing through it. Upon receiving the seventh input pulse, the seven-count-delay resets itself, causing its "1" output to drop to a binary "0" level where it no longer inhibits the gate 105. As a result, after thus removing the first six pulses from pulse train E, the seven-count-delay circuit 107 ceases to function until it is again set by pulse H after the required number of F and G pulses have been generated to completely shift and read out the contents of the input shift register.

When the parameters of 168 events have been detected, encoded, and transferred into the delay line memory units 49, the next major phase of the timing operation, the transfer of information from the MARK shift register 79 and from the delay line memory units 49 to the recording heads 53, begins. This is detected by the divide-by-168 circuit 117 which receives at its input the H pulse output of divide-by-six circuit 99, and which operates on the same principle as the divide-by-seven circuit shown in FIG. 8. Divide-by-168 circuit 117 produces a pulse J (FIG. 6*b*) after the sequence of events associated with the encoding and storage of 168 multiparameter events, marked by the generation of 168 H pulses, has been completed. Pulse J is fed to a delay circuit 119 and is also fed to the start input of the reel drive control circuit 73 causing the control to start the tape reel drive 75. The speed at which the tape 41 is driven is synchronized with the rate at which information is transferred to the tape by clock pulses CL through line 120 from the same clock 91 which is used to time the READ and SHIFT operations of the output shift register 57.

After a time required to bring the tape 41 up to recording speed, the delay 119 generates pulse J' (FIG. 6*b*) which sets flip flop 121 causing its "1" output to rise so as to generate a voltage level K for gating clock pulses through the AND gate 123. As a result, gated clock pulses L flow from the output of AND gate 123 for the duration of voltage K; that is, while the flip flop 121 is set.

Gated clock pulse L is used to derive the shift pulses S for shifting the MARK shift register 79 and the output shift register 57 and is also used to derive the three READ pulses N, P, and U for reading information from the MARK shift register 79, the delay line memory units 49, and the output shift register 57 respectively.

As will be recalled from the discussion of FIGS. 3 and 6*b*, three N pulses must be generated first to read out the contents of the MARK shift register after which 1008 P pulses must be generated to read out 1008 six bit groups needed to fill one block of information on the recording tape. It will also be recalled that between the first and second READ pulses N and between every subsequent READ pulse N or P, six shift pulses S must be generated.

To generate the N and P pulse trains, the gated clock pulse L is divided by seven to generate a pulse train M having pulses coinciding with every seventh pulse in the gated clock pulse train L. This division is performed by divide-by-seven circuit 125 which is of the same type as the corresponding circuit 97 used for deriving the F pulse train. The M pulse train is fed through an AND gate 127 which is initially enabled but which will be subsequently disabled for a purpose to be described, so that a pulse train M' flows from the output of the AND gate 127. The M' pulse train is fed to the first input of a pair of AND gates 129 and 131. Pulse train M' is also fed to the input of a four-count-delay 133 which is of the same type as the seven-count-delay described in connection with FIG. 9. The "1" output of the four-count-delay is fed to the second input of AND gate 129 while the "0" output of the four-count-delay 133 is fed to the second input of the second AND gate 131.

During the first three M pulses, and therefore during the first three M' pulses, the "1" output of the four-count-delay 133 is at a binary "1" level which enables AND gate 129 while the "0" output of the four-count-delay 133 is at a binary "0" level which does not enable the AND gate 131. Consequently, the first three M' pulses cause three pulses to flow from the output of AND gate 129 and these form the pulse train N for reading three times from the MARK shift register 79. On occurrence of the fourth M' pulse the four-count-delay 133 resets itself and the state of its outputs is reversed so that AND gate 129 is disabled and AND gate 131 is enabled causing the fourth M' pulse and all subsequent M' pulses to flow through the AND gate 131 appearing at its output as the READ pulse train P for reading information from the delay line memory units 49.

It was earlier stated in connection with the operations of the output shift register 57 of FIG. 3 that the train of pulses U used for reading information from the output shift register 57 to the recording heads 53 must not start until three N pulses and two P pulses have been generated (FIG. 6*b*).

Thus the first of the READ pulses U is to occur in coincidence with the third READ pulse P used to read information into the output shift register 57 from the delay line memory units 49. A further requirement upon the pulse train U is that there shall be five U pulses after the last P pulse so that the information contained in the thirty stages of the output shift register may be completely read out.

The requisite delay in the commencement of the U pulse train is accomplished by use of the six-count-delay 135 whose "0" output is connected to one input of AND gate 137. The input to the six-count-delay 135 is the pulse train M' and the output of AND gate 137 is the pulse train U. During the first five M' pulses the six-count-delay 135 is in set condition in which its "0" output is at the binary "0" level in which it does not enable the AND gate 137. On occurrence of the sixth M' pulse, which coincides with the third P pulse, the six-count-delay circuit resets itself, causing its "0" output to rise to the binary "1" level, enabling the AND gate 137 and causing pulses to flow through it and to appear at its output as the pulse train U. This enabling level remains at the zero output of the six-count-delay until it is again set after the last U pulse.

The extra five pulses at the end of the U pulse train are obtained by deriving the U pulse train from the M pulse train rather than from the M' pulse train as are the N and P pulse trains and by cutting off the flow of M' pulses before the M pulses so as to allow five extra M pulses to be generated after the last M' pulse. To accomplish this, a pulse counter detector 139 is provided which has a first output line 139a for producing a pulse thereon when 1011 pulses have been received by it and a second output line 139b for producing a pulse thereon when 1016 pulses have been received by the pulse count detector 139. The input to the pulse count detector is the pulse train M. The 1011 count output line 139a of the pulse count detector is inverted in the inverter 141 and fed to the second input of AND gate 127. The 1016 count detector line is connected to reset the pulse count detector 139 itself and is also connected to reset, on the 1016 the M pulse, the flip flop 121 and the four count and six count delay circuits 133 and 135.

The output pulse on the 1011 count output line 139a of the pulse count detector 139 will coincide with the 1008th pulse in the P pulse train and will cut off further flow of P pulses through the AND gate 131. M pulses, however, continue to flow unimpeded through the still enabled AND gate 127 until the 1016th M pulse has been received by the pulse count detector 139 at which time the flow of M pulses is also cut off by resetting of the flip flop 121. This removes the gate enabling signal K so that gated clock pulses L and with it the M pulses are discontinued.

In addition to the various READ pulses for reading information out of the delay line and shift register elements, there must also be generated a series of SHIFT pulses S for shifting information in the MARK and output shift registers. In particular, as shown in FIG. 6b, there must be 1011 groups of six shift pulses S, each group following each of the three N pulses and each of the 1008 P pulses. Additionally there must be five groups of six shift pulses S, each group preceding each of the final five pulses in the U pulse train.

The shift pulses S are derived from the gated clock pulse L in a manner similar to that in which the shift pulses G were derived from the gated clock pulse E. In particular, the gated clock pulses L are fed through an inhibit gate 143 having two inhibit inputs 143a and 143b. The first six of the gated clock pulses L are eliminated by the seven-count-delay circuit 145 which is initially in set condition so as to apply through its "1" output line an inhibiting voltage to the first inhibit input 143a of the inhibit gate 143. Upon occurrence of the seventh gated clock pulse L the seven-count-delay circuit 145 resets itself and removes the inhibiting input signal from the inhibit input 143a of the inhibit gate.

The seventh pulse in the gated clock pulse train L and every seventh pulse in that pulse train thereafter is eliminated by the pulses M which appear at the output of divide-by-seven counter 125. These pulses are applied to the second inhibit input 143b of the gate 143 so that upon occurrence of every seventh gated clock pulse L, that is upon occurrence of every pulse M, the inhibit gate prevents the appearance of a pulse at its output. Therefore, except for the first six pulses in the gated clock pulse train L and except for every pulse in the gated clock pulse train L which coincides with a pulse M, a pulse S will appear at the output of inhibit gate 143. Thus, six S pulses will appear at the output of inhibit gate 143 following each M pulse except the last which causes resetting of the flip-flop 121 and cessation of the gated clock pulses L. The last M pulse also resets the pulse count detector 139, and sets the four- and six-count-delay circuits 133 and 135 so as to place them in readiness for the next series of 168 counts.

*Read-out equipment*

To utilize the information recorded in blocks on the tape 41 an arrangement such as that shown in FIG. 10 may be employed. The tape 41, having on it successive blocks of information (not shown in FIG. 10), each block representing the multiparameter addresses of 168 events, is moved from a tape supply reel 78 to a tape-up reel 77 by a reel drive 75 under the control of a reel drive control unit 73. The supply reel, take-up reel, reel drive, and reel drive control may be the same components as those which are shown in FIG. 3 as part of the recording system. Alternatively, these components may be in a separate playback unit located remotely from the recording unit of FIG. 3.

To read the data recorded on the tape 41, it is moved past a set of six read heads 147 whose outputs are fed to data processing equipment 149. The data processing equipment is programmed to interpret each group of 36 characters as a multiparameter address and is also programmed to register the number of times each particular address occurs. The address distribution is then printed or displayed in unit 151 depending upon the form in which the information is desired.

In certain circumstances the user may wish to select only particular addresses for analysis. Such selection may be readily accomplished by use of selection logic 153 which tells the data processing equipment that it should store and register the number of occurrences of only particular addresses. Alternatively, the selection logic may command the data processing equipment to give special treatment to particular multiparameter addresses such as giving them greater prominence in the display effected by the display unit 151 than that given to non-selected addresses.

The data recorded on tape 41 may be played back manually, a block at a time by application of a manual start signal to the reel drive control 73. In such a case the data processing equipment will generate an end-of-block signal in response to the end-of-block character in the block, causing the reel drive control 75 to stop the tape. Alternatively, other playback schemes may be employed for automatic playback of the tape block after block, read-out of a given block of tape following automatically the processing of data from the previous block. Thus, several blocks of parameter address representing characters may be read from the tape 41 and fed to the data processing equipment 149 before print out or display of the address distribution computed by the data processing equipment 149.

CONCLUSION

There has been described, first generally and then in detail, a system which accumulates multiparameter address defining bits in temporary memory units such as recirculating delay lines until enough data has been accumulated to fill one tape block. A tape recorder is then started and the accumulated data is recorded on the tape as the latter moves through a distance equal to one block. The tape reader may then stop and remain idle until another set of data sufficient to fill one block is accumulated. Thus there may be an interval of seconds to hours between each recording of a block of information on the magnetic tape. In the end all of the randomly accumulated data has been tightly packed and can be reproduced quickly when the tape is replayed.

I claim as my invention:

1. In a multiparameter analyzer wherein N parameters of an event are detected and encoded as a group of NB bits, a data organization system for converting the parameter-representing bits of E randomly occurring events into a stream of evenly time spaced $NBE/T$ T-bit characters suitable for recording through T heads onto a block portion of T track tape comprising T single input, single output memory units for temporarily storing the parameter-representing bits of said E events;

means for transferring the NB bits of each event into said T memory units in parallel T bits at a time, after the occurrence and encoding of each said event, until the parameter-representing bits associated with E events have been stored in said memory units; and means for transferring the contents of said memory units to the recording heads T bits at a time in the form of regularly time spaced T-bit characters after the parameter-representing bits of E events have been stored in said memory units.

2. The data organization system of claim 1 wherein said means for transferring the contents of said memory units includes a shift register having a first set of T stages coupled to the outputs of said T memory units for receiving information therefrom a T-bit character at a time, and a second set of T stages, coupled to said T recording heads for transferring information to said recording heads a T-bit character at a time.

3. The data organization system of claim 1 additionally including means for bringing said tape up to recording speed, past said recording heads when said characters begin to be delivered to said heads, and means for synchronizing the speed of said tape and the rate of character transfer to said recording heads so that during the periods that a block portion of tape is drawn past the recording heads NBE/T characters are delivered to said recording heads.

4. In a multiparameter analyzer wherein N parameters of an event are detected and encoded as a group of NB bits, a data organization system for converting the parameter-representing bits of E randomly occurring events into a stream of evenly time spaced NBE/T T-bit characters suitable for recording through T heads onto a block portion of T track tape comprisng T single input, single output memory units for temporarily storing the parameter-representing bits of said E events;

means for transferring the NB bits of each event into said T memory units in parallel T bits at a time, after the occurrence and encoding of each said event, until the parameter-representing bits associated with E events have been stored in said memory units;

a shift register having a first set of T stages coupled to the outputs of said T memory units for receiving information therefrom a T-bit character at a time and a second set of T stages coupled to said T recording heads for transferring information to said recording heads a T-bit character at a time;

means for bringing said tape up to recording speed, past said recording heads when said characters begin to be delivered through said shift register to said recording heads; and means for maintaining the relationship between the speed of said tape and the rate of character transfer through said shift register to said recording heads such that during the period that a block portion of tape is drawn past the recording heads, NBE/T characters are delivered to said recording heads.

5. In a multiparameter analyzer a data organization system for efficiently recording on a multitrack recording tape the parameter addresses of randomly occurring events comprising means for converting the parameters of each event into a binary coded pulse group representing the values of the event;

a set of rapid access memory units for temporarily storing said binary coded pulse group;

means for transferring said binary coded pulse group from said converting means to said rapid access memory units in response to the conversion of the parameters of each event;

means responsive to the storage in said rapid access memory units of the pulse groups representing a predetermined number of events for transferring said pulse groups from the rapid access memory units to said recording tape; and means responsive to the beginning and to the end of the transfer of pulse groups from the rapid access memory units to the recording tape for starting and stopping movement of said tape in synchronism with said transfer.

6. In a multiparameter analyzer a data organization system for recording on a multitrack recording tape the parameter addresses of randomly occurring events comprising means for converting the parameters of each event into a set of bits;

a set of recirculating memmory units for temporarily storing said bits;

means for transferring said bits from said converting means to said recirculating memory units in response to the conversion of the parameters of each event;

means, including a shift register, responsive to the storage in said recirculating memory units of the bits representing a predetermined number of said randomly occurring events for transferring said bits from said memory units to said recording tape; and means responsive to the beginning and to the end of the transfer of bits from the memory units for storing and stopping the recording tape in synchronism with said transfer.

7. In an N parameter analyzer, a data organization system for depositing on T tracks of a movable, continuous ribbon type of record medium the N-parameter addresses of E time spaced events comprising means for converting the N parameters of each of said events into NB concurrently stored bits;

T rapid access single input, single output memory units for temporarily storing the NBE bits representing the parameters of said E events;

means having T information transfer channels, and responsive to the conversion of each event into bits for transferring the contents of said converting means through said channels to said memory units T bits at a time;

T recording heads each operatively coupled to one of said tracks for depositing information thereon;

a second set of T information transfer channels connected between the outputs of said rapid access memory units and said recording heads, each channel being operative to transfer the contents of a given memory unit to a given track;

means responsive to the storage of the address-representing bits of E events in said memory units to transfer the bits stored in said memory units through said second set of channels to said record medium T bits at a time; and means responsive to the flow of bits from said memory units to said recording heads to move said record medium relative to said recording heads in synchronism with said flow.

8. The data organization system of claim 7 wherein said second set of T information transfer channels includes a shift register having a first set of T stages for receiving information from said T memory units, and a second set of T stages for making available for transfer to the T recording heads the contents of the first T stages of said shift register, and wherein said means responsive to storage in said memory units includes means for successively transferring the contents of said memory units to said first set of T stages T bits at a time,
shifting the contents of said first T stages to said second T stages, and
transferring the contents of said second T stages to said T recording heads.

9. The data organization system of claim 8 wherein said rapid access memory units comprise recirculatory delay lines.

10. In an N parameter analyzer a data organization system for recording on T tracks of magnetic tape the N-parameter addresses of E time spaced events comprising
(a) means for converting the N parameters of each said event into NB concurrently stored bits;
(b) T delay line memory units for temporarily storing through repeated recirculation the NBE bits representing the parameters of said events;
(c) means including a first set of T gated transfer channels individually coupled to the inputs of said delay line memory units and responsive to the conversion of the N parameters of each event into bits for sequentially gating the contents of said converting means to said delay line memory units T bits at a time so that the bits in each said group of T bits recirculate in said delay lines in phase with one another;
(d) T recording heads, each operatively coupled to one of said tracks for recording data thereon;
(e) an output shift register having first and second sets of T stages;
(f) a second set of T gated transfer channels individually coupling the outputs of the T delay line memory units to said first set of T stages on said output shift register;
(g) a third set of T gated transfer channels individually coupling said second set of T stages of said output shift register to said T recording heads;
(h) timing means responsive to the storage of NBE bits in said T delay line memory units
  (1) to start movement of said tape past said recording heads, and
  (2) for each group of T recirculating bits to successively
    (a) enable said second set of transfer channels to admit a group of T bits to said first set of T output register stages,
    (b) shift the contents of said first set of T stages into said second set of T stages, and
    (c) enable said third set of transfer channels to actuate said recording heads in accordance with the contents of said second T stages, and
(i) timing means responsive to the transfer of NBE bits to said tape for stopping said tape a predetermined time after such transfer.

11. In a method for recording through T recording heads the NB bit multiparameter addresses of a series of randomly spaced events as L T-bit characters on a block of T track tape the steps which comprise
(a) concurrently storing the NB bits of an event address;
(b) transferring said NB bits into T single input, single output memory units in parallel T bits at a time;
(c) repeating steps (a) and (b) for LT/NB events so as to accumulate L T-bit characters in said memory units; and
(d) upon completion of step (c), sequentially transferring the contents of the memory units in parallel T bits at a time to the recording heads in a succession of L evenly timed spaced steps.

12. The method of claim 11 additionally including the step of accelerating the tape up to recording speed just before transfer of the first character to the recording heads, maintaining the tape at a speed at which a block of tape will pass the recording heads during the time that L characters are transferred to the recording heads, said method also including the step of stopping the tape motion after the last character has been delivered to the recording heads for recording on the tape.

13. In a method for recording through T recording heads the multiparameter addresses of E time spaced events on T tracks of continuous tape the steps which comprise
(a) converting the parameters of each event into a concurrent group of bits;
(b) transferring said bits into T parallel memory units T bits at a time;
(c) repeating steps (a) and (b) for E events so as to transfer into said T memory units the multiparameter address-representing bits for E events;
(d) upon completion of step (c) bringing the tape up to a predetermined speed and then sequentially transferring in parallel the successive sets of T bits in the respective memory units to respective ones of the T recording heads in a succession of steps synchronized with the speed of said tape until all multiparameter address-representing bits for the past E events have been transferred from the memory units to the tape; and
(e) stopping said tape motion in response to completion of step (d).

14. In a method for recording through T recording heads the multiparameter addresses of time spaced events on T tracks of continuous tape, the steps which comprise
(a) converting the parameters of each event into a concurrent group of bits;
(b) transferring said bits into T recirculating memory units T bits at a time;
(c) repeating steps (a) and (b) for E events so as to transfer into said T memory units the multiparameter address-representing bits for E events;
(d) upon completion of step (c) bringing the tape up to a predetermined speed past the recording heads and when said speed has been attained sequentially transferring bits in the respective member units to individual ones of the T recording heads in a succession of steps synchronized with the speed of said tape, a single bit being transferred from each memory unit to its associated recording head during each step so as to form a line of T bits on said tape until all multiparameter address-representing bits for the past E events have been transferred from the memory units to the tape; and
(e) stopping said tape motion a predetermined time after completion of step (d) the multiparameter address-representing bits of the next E events have been transferred into the memory units.

15. In a method for recording through T recording heads the multiparameter addresses of time spaced events on T tracks of continuous tape intermittently movable at a set speed the steps which comprise
(a) converting the parameters of each event into bits;
(b) sequentially transferring said bits into T recirculating memory units in successive groups of T bits and recirculating said transferred contents in said memory units;
(c) repeating steps (a) and (b) for E events so as to transfer into said T memory units the multiparameter address-representing bits for E events;
(d) upon completion of step (c) bringing the tape up to a predetermined speed past the recording heads and then, when said speed has been attained, transferring bits in the respective memory units to a first set of T stages of a shift register, shifting the contents of said first set of stages into a second set of T stages of said shift register, and transferring the contents of said second set of stages to individual ones of the T recording heads in a succession of steps synchronized with the speed of said tape until all multiparameter address-representing bits for the past E events have been transferred from the memory units to the tape; and (e) stopping said tape motion a predetermined time after completion of step (d) until the multiparameter address-representing bits of the next E events have been transferred into the memory units.

References Cited

UNITED STATES PATENTS

| | | | |
|---|---|---|---|
| 3,337,855 | 8/1967 | Richard et al. | 340—172.5 |
| 3,312,945 | 4/1967 | Berezin et al. | 340—172.5 |
| 3,288,928 | 11/1966 | Bartlett et al. | 178—50 |
| 3,229,259 | 1/1966 | Barker et al. | 340—172.5 |
| 3,153,776 | 10/1964 | Schwartz | 340—172.5 |
| 2,988,735 | 6/1961 | Everett et al. | 340—174.1 |
| 2,905,930 | 9/1959 | Golden | 340—174 |

GARETH D. SHAW, *Primary Examiner.*